US009913181B1

(12) United States Patent
Oroskar et al.

(10) Patent No.: US 9,913,181 B1
(45) Date of Patent: Mar. 6, 2018

(54) REFERENCE SIGNAL POWER VARIATION TO INDICATE LOAD INFORMATION

(71) Applicant: Sprint Spectrum L.P., Overland Park, KS (US)

(72) Inventors: Siddharth Oroskar, Overland Park, KS (US); Clark Halferty, Lees Summit, MO (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 80 days.

(21) Appl. No.: 14/835,902

(22) Filed: Aug. 26, 2015

(51) Int. Cl.
| H04W 36/00 | (2009.01) |
| H04W 52/38 | (2009.01) |
| H04W 36/22 | (2009.01) |
| H04B 17/318 | (2015.01) |
| H04W 24/10 | (2009.01) |

(52) U.S. Cl.
CPC ...... *H04W 36/0083* (2013.01); *H04B 17/318* (2015.01); *H04W 24/10* (2013.01); *H04W 36/22* (2013.01); *H04W 52/38* (2013.01)

(58) Field of Classification Search
CPC . H04W 36/0083; H04W 36/22; H04W 36/30; H04W 36/0061; H04W 36/0072; H04W 36/0088; H04W 36/0094; H04W 24/10; H04W 52/38; H04B 17/318
See application file for complete search history.

(56) References Cited

U.S. PATENT DOCUMENTS

| 7,787,899 | B1* | 8/2010 | Talley | H04W 52/325 455/450 |
| 8,055,293 | B1* | 11/2011 | Vargantwar | H04W 52/362 455/423 |
| 2004/0242257 | A1* | 12/2004 | Valkealahti | H04W 16/06 455/522 |
| 2005/0059408 | A1* | 3/2005 | Tiedemann, Jr. | H04W 16/00 455/452.1 |
| 2005/0250527 | A1* | 11/2005 | Jugl | H04W 16/06 455/522 |
| 2010/0136979 | A1* | 6/2010 | Yang | H04W 36/0061 455/442 |
| 2010/0222063 | A1* | 9/2010 | Ishikura | H04B 7/024 455/450 |

(Continued)

OTHER PUBLICATIONS

Preinterview First Office Action dated Oct. 3, 2017, issued in connection with U.S. Appl. No. 15/491,580, filed Apr. 19, 2017, 5 pages.

*Primary Examiner* — Habte Mered

(57) ABSTRACT

Described embodiments can help a user equipment (UE) participate in a handover procedure that is carried out by the UE's serving base station. In particular, when a neighbor sector is heavily loaded, the base station that serves the neighbor sector may vary the power in at least one reference signal in each subframe in the neighbor sector, thereby providing an indication of the heavy traffic load to UEs that receive the subframe. When a UE is being served by a different base station than the base station that serves the neighbor sector, and the UE detects such load information for a neighbor sector, the UE may report the load information to its serving base station, or may simply refrain from sending a signal strength report that could trigger a handover to the neighbor sector.

23 Claims, 8 Drawing Sheets

(56) References Cited

U.S. PATENT DOCUMENTS

| | | | |
|---|---|---|---|
| 2011/0255514 A1* | 10/2011 | Olofsson | H04W 72/0426 |
| | | | 370/331 |
| 2011/0299474 A1* | 12/2011 | Li | H04W 16/02 |
| | | | 370/328 |
| 2012/0046030 A1 | 2/2012 | Siomina et al. | |
| 2012/0115541 A1* | 5/2012 | Suga | H04W 36/22 |
| | | | 455/525 |
| 2012/0208523 A1* | 8/2012 | Hans | H04W 64/00 |
| | | | 455/422.1 |
| 2013/0040692 A1* | 2/2013 | Chen | H04W 36/04 |
| | | | 455/525 |
| 2013/0189971 A1* | 7/2013 | Callender | H04W 36/0094 |
| | | | 455/423 |
| 2015/0333880 A1 | 11/2015 | Yi et al. | |
| 2016/0242083 A1* | 8/2016 | Guan | H04W 24/08 |
| 2016/0269967 A1* | 9/2016 | Suzuki | H04W 16/32 |

* cited by examiner

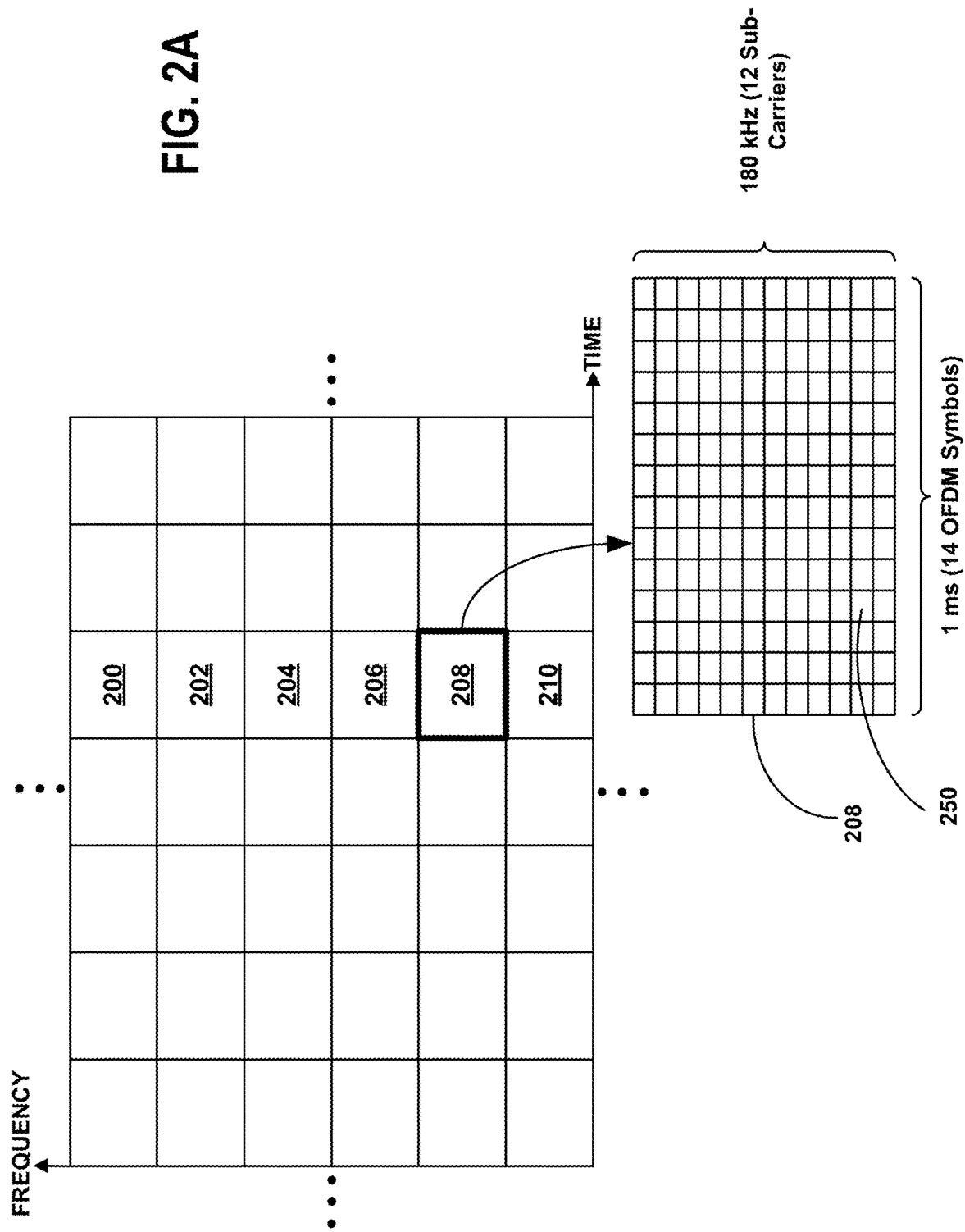

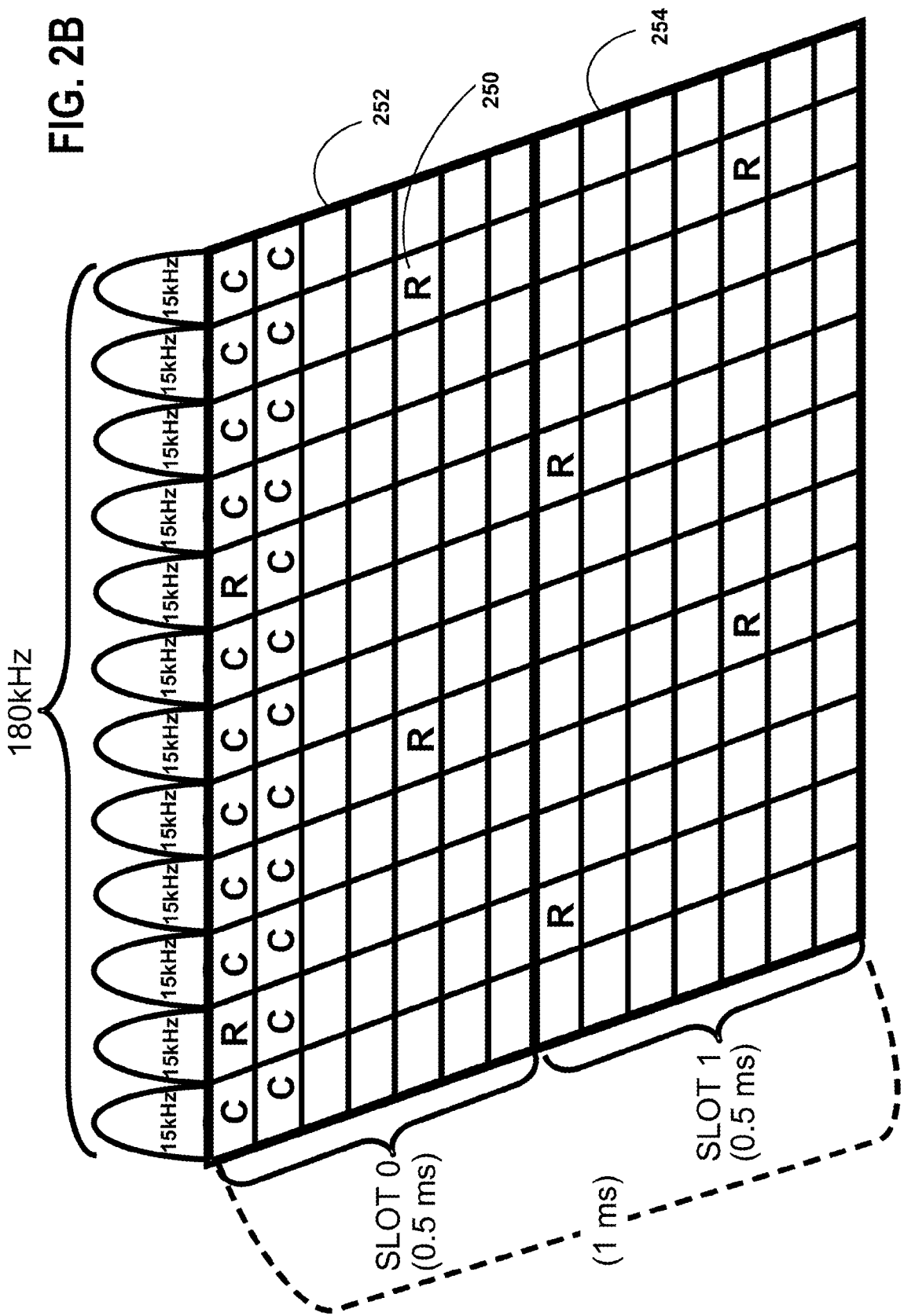

US 9,913,181 B1

REFERENCE SIGNAL POWER VARIATION TO INDICATE LOAD INFORMATION

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of UEs, initiation of communications, handover of between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a UE is within coverage of a base station, the base station may from time to time transmit downlink control signaling to the UE. The purpose of such downlink control signaling may depend on the air interface protocol and the circumstances. By way of example, each coverage area may define a downlink control channel that may carry certain information such as control channel formatting information, a downlink reference signal that UEs may detect as an indication of coverage, system information, paging information, and the like, or may define various downlink control channels for carrying subsets of this information.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

A UE may also move between neighboring coverage areas of one or more base stations. More specifically, as a UE moves between wireless coverage areas of a wireless communication system, such as between different base stations, or when network conditions change or for other reasons, the UE may "hand off" or "handover" from operating in one coverage area to operating in another coverage area. In a usual case, this handover process is triggered by the UE monitoring the signal strength of various nearby available coverage areas, either as a matter of routine operation, or in response to a directive by the UE's serving base station to monitor for one or another handover trigger condition. When a handover condition is met, the UE's serving base station may then initiate a handover procedure. By convention, a UE is said to handover from a "source" (or serving) base station to a "target" base station.

In a further aspect of LTE, Under LTE, downlink and uplink air interface resources are mapped into frames, with each frame being further divided into a number of subframes that are further divided into slots. LTE further defines a particular grouping of resources arrayed across one subframe in the time-domain and 12 sub-carriers in the frequency-domain as a "resource block." Further, each resource block contains an array of 14 OFDM symbols by 12 sub-carriers, with each symbol and sub-carrier pair being referred to as a "resource element." A resource block may therefore include 168 "resource elements."

An eNodeB typically broadcasts a reference signal in a number of resource elements distributed throughout the downlink frequency bandwidth. More specifically, there may be particular resource elements that are designated for resource signals in each subframe that is transmitted in a given coverage area. A UE operating in the coverage area may receive these reference signals, and further, may determine the received power level of each reference signal that is received. The UE may then determine a measure of the eNodeB's signal strength, which is referred to as a reference signal received power (RSRP). In particular, the UE may determine the RSRP by determining an average received power across all the reference signals that are received in the same subframe.

In some cases, when the UE is operating in a first coverage area, the UE may determine an RSRP a second coverage area that ultimately triggers a handover of the UE to the second coverage area. More specifically, a UE may report the RSRP for a second coverage area to the eNodeB that is serving the UE in a first coverage area. This eNodeB may in turn use the RSRP to evaluate whether the UE should handoff to the second coverage area; e.g., by comparing the RSRP for the second coverage area to a measure of signal strength in the first coverage area. Then, if the eNodeB determines a handoff is appropriate, the eNodeB may instruct the UE to handoff to the second coverage area.

OVERVIEW

In a scenario where an RSRP message causes a source eNodeB to consider an inter-eNodeB handoff of a UE to a coverage area served by another eNodeB (which may be referred to as a "target" eNodeB), it may be desirable for the source eNodeB to have a backhaul connection (e.g., an X2 communication link) with the target eNodeB. Provided with such a backhaul link, the source eNodeB may determine the other eNodeB's traffic load, and in particular the traffic load in the coverage area to which a handoff of the UE is being considered. The source eNodeB can then take the other eNodeB's load into account in the handover decision.

However, in some situations, the source eNodeB may not be able to obtain loading information from the target eNodeB. For example, load information may be unavailable to the source eNodeB because inter-eNodeB communication is not feasible at the time. As a specific example, load information may be unavailable when no backhaul link exists between the source eNodeB and target eNodeB, or possibly when there is a high load on the backhaul link between the source eNodeB and target eNodeB that prevents communication between these eNodeBs.

In current implementations, when neighbor load information is unavailable to the source eNodeB, the source eNodeB may be configured to none-the-less initiate a "blind" handover of a UE to a coverage area having the best signal strength (or at least having better signal strength than the coverage area in which the UE is currently operating), according to RSRP(s) that the UE provides to the source eNodeB.

When a "blind" handover is performed, and the target eNodeB is heavily loaded, this can lead to undesirable situations. For example, a blind handover to a heavily loaded eNodeB can result in a UE's call being dropped or failing. In other cases, such a blind handover may lead to a "ping-pong" scenario in which the UE is rapidly handed off back-and-forth handovers between two eNodeBs (e.g., back and forth between the source eNodeB and the target eNodeB). Exemplary embodiments may help to address the problems associated with blind handover in existing implementations by helping to prevent a blind handoff to a target eNodeB that is heavily loaded, and/or by helping a source eNodeB acquire load information for a target eNodeB, even when backhaul communications between the source eNodeB and the target eNodeB are not possible.

More specifically, in an exemplary embodiment, an eNodeB may broadcast a high-load indicator by varying the power level in a predefined one of the reference signal resource elements as compared with the power level in the other reference signal resource elements. This predefined resource element may be referred to herein as the "load-indication resource element" within a given subframe.

For instance, during each uplink subframe, an eNodeB may adjust the power level of the reference signal in a predefined resource element by +/−1 dB, as compared to the other reference signals included in the subframe. In some implementations, a +/−1 dB change in the transmission power of the resource signal in load-indication resource element may be a change of approximately +/−40% as compared to the resource signals transmitted in other resource elements. On the other hand, when a given coverage area is not heavily loaded, the eNodeB serving the coverage area may transmit the reference signal in the load-indication resource element at the same power level as the other reference signals that are transmitted in the same subframe, or perhaps with less variance (e.g., +/−0.5 dB) from the transmission power of the other reference signals in the subframe than when the coverage area is heavily loaded. In either case, such a variation in transmission power will typically be detectable by a UE that is evaluating the eNodeB's reference signal strength. As such, UEs in the coverage area may determine load information for the coverage area by analyzing the power level of the reference signal in the load-indication resource element.

Further, when a UE determines load information via such power variation in resource signals, the UE may report the load information to other eNodeBs and/or adjust its functionality in other ways in an effort to avoid a handover to a heavily loaded eNodeB. More specifically, when a UE is operating in a first coverage area and detects a subframe for a second coverage area in which the received signal strength of one of the reference signals varies from the received signal strength of the other reference signals in the same subframe by more than some threshold amount, the UE may responsively forgo reporting the RSRP for the second coverage area. In the event that the heavily-loaded second coverage area is served by a different eNodeB than the first coverage area, the foregoing technique may preclude the source eNodeB (serving the first coverage area) from potentially performing a blind handoff to the heavily-loaded second coverage area (e.g., as a result of the source eNodeB being unaware of the high load at the second eNodeB).

In other embodiments, upon detecting the threshold variance in the power level of the load-indication reference signal, a UE may report to its serving eNodeB not only the measured RSRP for the second coverage (perhaps based on the other reference signal resource elements), but also an indication that the candidate sector has a high traffic load (which may in turn indicate a high load at a target eNodeB, in the event the candidate sector is served by a different eNodeB than the serving eNodeB). The serving eNodeB may then use the load information provided by the UE as a further basis to make a handover decision. In particular, the serving eNodeB may use load information pertaining to a target eNodeB, which is provided by the UE, in the same or similar manner as it would if it were able to acquire such load information via a backhaul link with the target eNodeB.

In one aspect, an exemplary method involves a base station: (a) during a first subframe in a first coverage area, transmitting, a first plurality of reference signals, wherein respective transmission power levels of the first plurality of reference signals are the same or vary from one another by less than a predetermined amount; (b) subsequently detecting a high traffic level in the first coverage area; and (c) in response to detecting the high traffic load, transmitting a second plurality of reference signals during a second subframe in the first coverage area, wherein a transmission power level of at least one of the second plurality of reference signals varies from the transmission power level of at least one other reference signal in the second plurality of reference signals by the predetermined amount. As such, the variation in transmit power level amongst the second plurality of reference signals may serve as an indication, to a receiving UE, that the first coverage area has a high traffic level.

In another aspect, an exemplary base station may include at least one communication interface configured to provide service in at least a first coverage area, at least one processor, and program instructions stored in a non-transitory computer readable medium. The program instructions are executable by the at least one processor to: (a) transmit a first plurality of reference signals during a first subframe in the first coverage area, wherein respective transmission power levels of the first plurality of reference signals are the same or vary from one another by less than a predetermined amount; (b) subsequently detect a high traffic load in the first coverage area; and (c) in response to detection of the high traffic load in the first coverage area, during a second subframe, transmit a second plurality of second reference signals in the first coverage area, wherein a transmission power level of at least one of the second plurality of reference signals varies from the transmission power level of at least one other reference signal in the second plurality of reference signals by a predetermined amount.

In a further aspect, an exemplary method may be carried out by a UE that is operating in a first coverage area. In particular, the method involves such a UE: (i) receiving, during a given subframe, a plurality of reference signals for a second coverage area, wherein each reference signal has a corresponding received signal strength; (ii) determining a measure of received power for the second coverage area based at least in part on the plurality of reference signals; (iii) determining that the received signal strength of at least one of the reference signal varies from the received signal strength of at least one other of the reference signals in accordance with a pre-defined power variation; (iv) and in response to determining that the variation in received signal strength between the at least one of the reference signals and the at least one other of the reference signals is in accordance with the pre-defined power variation, sending, to a base station serving the first coverage area, both: (a) a signal strength report indicating the measure of received power, and (b) an indication that a high traffic load exists in the second coverage area.

In an additional aspect, an exemplary method may be carried out by a UE that is operating in a first coverage area. In particular, the method involves such a UE: (a) receiving, during a given subframe, a plurality of reference signals corresponding to a second coverage area, wherein each reference signal has a corresponding received signal strength; (b) determining that the received signal strength of at least one of the reference signal varies from the received signal strength of at least one other of the reference signals in accordance with a pre-defined power variation; and (c) in response to determining that the variation in received signal strength between the at least one of the reference signals and the at least one other of the reference signals is in accordance with the pre-defined power variation, refraining from sending a signal strength report to a base station serving the first coverage area.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which:

FIG. 2A illustrates how the resources in a given wireless coverage area may be divided in time and frequency domains into resource blocks under LTE;

FIG. 2B shows a grouping of two downlink resource blocks during a single subframe, according to an exemplary embodiment;

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, the present methods and systems will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. EXEMPLARY NETWORK ARCHITECTURE

Figure 1:
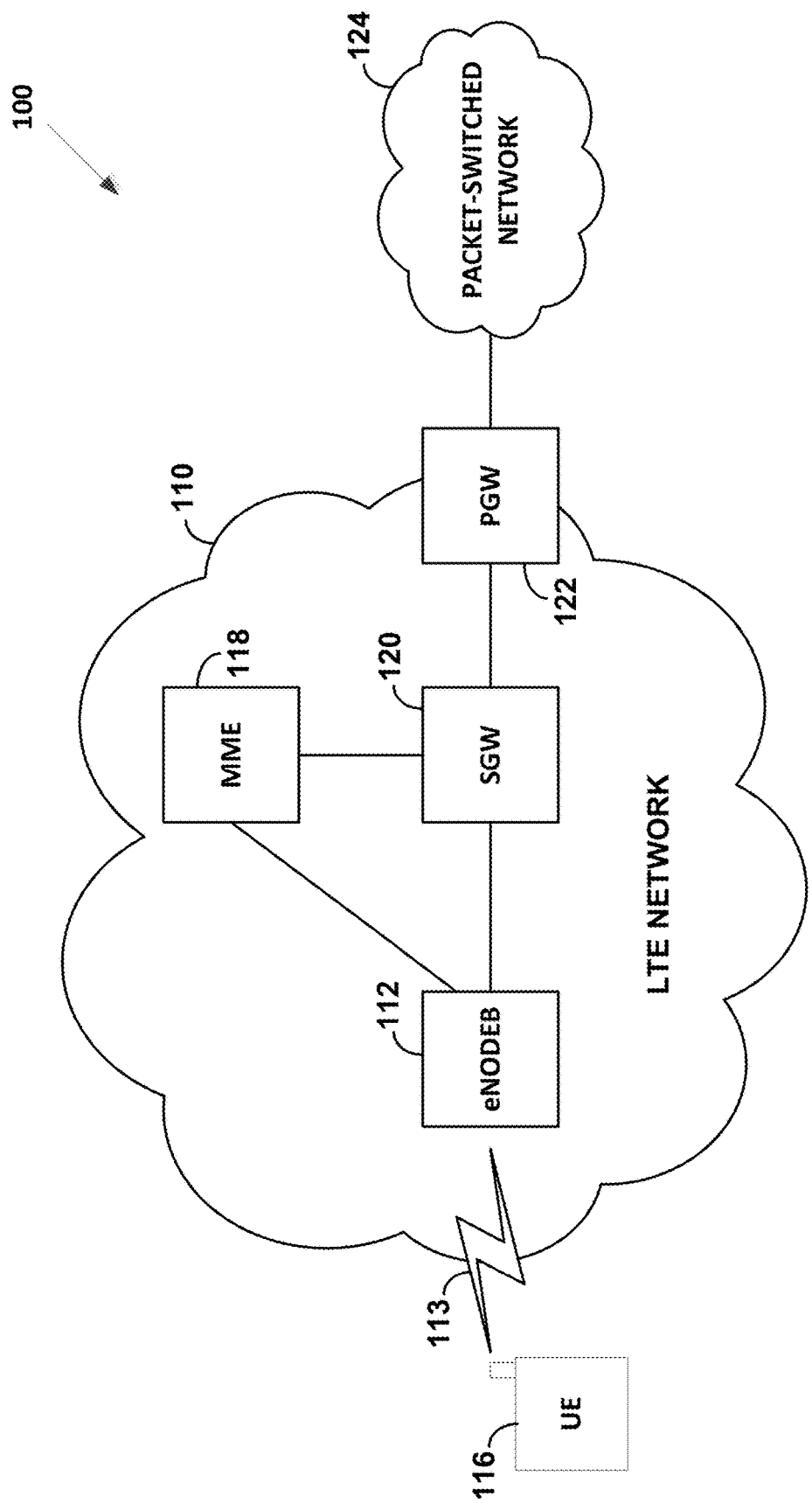
FIG. 1 is a simplified block diagram of a wireless communication system in which an example of the present method can be implemented.

Referring to the drawings, FIG. 1 is a simplified block diagram of a wireless communication system 100 in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. The eNodeB is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

Each coverage area of a base station, such as the eNodeB 112, may operate on one or more RF carriers (or carrier bands) spanning 1.4 MHz, 3 MHz, 5 MHz, 10 MHz, 15 MHz, or 20 MHz of electromagnetic spectrum. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms subframes that are in turn each divided into two 0.5-ms slots. Thus, each frame has 10 subframes, and each subframe has 2 slots; the 1-ms duration of a subframe also defines a "transmission time interval" (TTI). Slots are each further sub-divided into a number (typically 7) of modulation intervals, or "symbol times." In the frequency domain, data for transmission during each symbol time are jointly modulated over a sequence of sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. Each sub-carrier is 15 kHz wide, so each group of 12 sub-carriers occupies a 180 kHz bandwidth.

LTE further defines a particular grouping of resources arrayed across one subframe (1 ms) in the time-domain and 12 sub-carriers in the frequency-domain as a "resource block." Typically, in a time-domain, representation, the 1-ms duration of a resource block contains 14 symbol times accommodating 14 OFDM symbols, each spanning 66.7 microseconds (μs) plus a 4.69 μs guard band (cyclic prefix) added to help avoid inter-symbol interference. Thus, in the time-domain, each resource block contains 14 OFDM symbols by 12 sub-carriers, thereby constituting an array of 168 "resource elements." Depending on the bandwidth of the carrier, the air interface may support transmission on a number N of such resource blocks in each subframe. For instance, a 5 MHz carrier supports N=25 resource blocks in each 1-ms subframe, whereas a 20 MHz carrier supports N=100 resource blocks in each 1-ms subframe.

A resource element is to the smallest unit of resource allocated on the LTE air interface. Each resource element corresponds to one modulated data symbol on one sub-carrier during one symbol time. As noted, when represented in the time domain, a resource block that consists of 12 sub-carriers and 14 OFDM symbols has 168 resource elements. Each modulated symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band corresponds to one OFDM symbol.

Within a resource block, different resource elements can serve different functions. For instance, on the downlink, certain resource elements across the bandwidth may be reserved to define a physical downlink control channel (PDCCH) for carrying control signals such as page messages and resource allocations from the eNodeB to UEs, and other resource elements may be reserved to define a physical downlink shared channel (PDSCH) that the eNodeB can allocate to carry transmissions to particular UEs on an as-needed basis. Likewise, on the uplink, certain resource elements across the bandwidth may be reserved to define a physical uplink control channel (PUCCH) for carrying control signals such as scheduling requests from UEs to the eNodeB, and other resource elements may be reserved to define a physical uplink shared channel (PUSCH) that the eNodeB can allocate to carry transmissions from particular UEs on an as-needed basis.

FIG. 2A illustrates how the resources in a given wireless coverage area may be divided in time and frequency domains into resource blocks under LTE. In the time domain, each resource block occupies a 1-ms subframe. By way of example, FIG. 2A shows resource blocks 200-210 for a portion of a subframe. In the frequency domain, each of the resource blocks 200-210 occupies a respective portion of frequency bandwidth, typically 180 kHz. For purposes of illustration, FIG. 2A shows resource blocks across just six subframes in time and six 12-sub-carrier groupings in frequency. However, as noted above, each LTE frame typically has 10 subframes, while the number of resource blocks spanning frequency depends on the bandwidth of the carrier. For instance, in a 5 MHz LTE carrier, a total of 25 resource blocks may span frequency during each 1 ms subframe. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms subframe corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Note that in some implementations, a resource block 208 corresponding to a 1 ms subframe in the time domain and 14 OFDM symbols (e.g., 180 kHz) in the frequency domain may be referred to more specifically as a "scheduling resource block." In such an implementation, the term "resource block" may refer to a grouping of resources arrayed across one 0.5 ms slot in the time-domain and 12 sub-carriers in the frequency-domain, thereby constituting an array of 84 resource elements. Note that since there are two 0.5 ms slots in each a 1 ms subframe, such grouping means that there will be two resource blocks during each 1 ms subframe (and two resource blocks within each scheduling resource block). For example, FIG. 2B shows a grouping of two downlink resource blocks 252 and 254 during a single subframe, with each resource block 252 and 254 corresponding to one 0.5 ms slot.

FIG. 2B also shows the use of different resource elements for different purposes is illustrated by way of example for a downlink resource blocks in FIG. 2B. In particular, four of the resource elements in each resource block 252 and 254 are labeled "R" to indicate that each of these resource elements is reserved for a reference signal, which is used by UEs for purposes of channel estimation. In addition, 22 of the resource elements in the first two OFDM symbols are labeled "C" to indicate that they are used to transmit control signaling (including for instance the PDCCH). (However, note that such reservations for control signaling are not required, and/or may vary from that shown in FIG. 2B.) The resource elements that are unlabeled may be used for various purposes, such as for defining the PDSCH for transmitting bearer data and other scheduled transmissions. It is to be understood that FIG. 2B illustrates only one possible configuration, and that a resource block could have other configurations as well.

Figure 3:
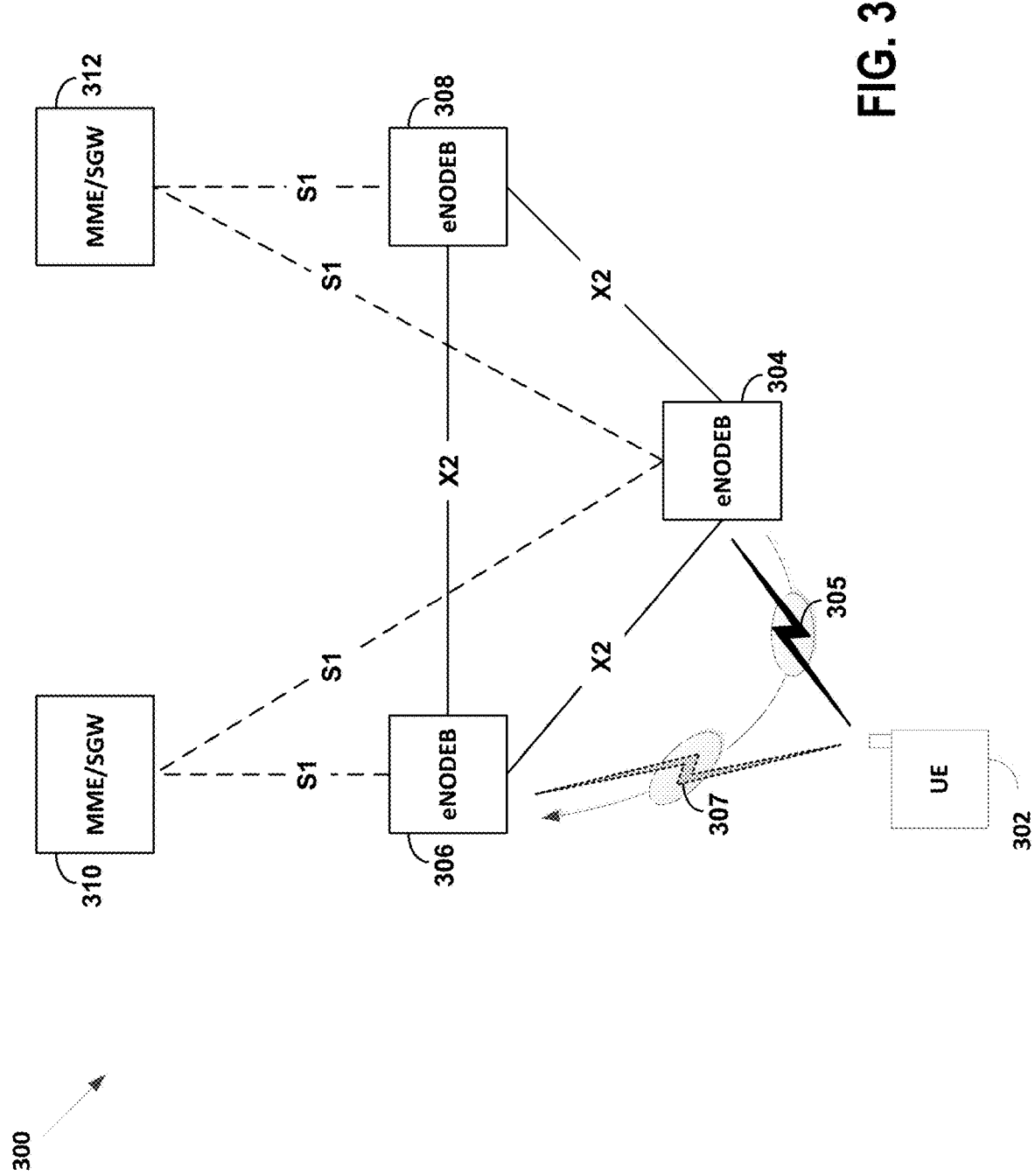
FIG. 3 is a simplified block diagram of aspects of an exemplary wireless communication system relating to handover.

FIG. 3 is a simplified block diagram of aspects of an example wireless communication system 300 relating to handover. By way of example, the system 300 includes eNodeBs 304, 306 and 308, each communicatively connected to one another by respective "X2" interfaces. The system 300 also includes an MME/SGW 310 and 312, each of which could correspond to merged functionality of the MME 118 and SGW 120 in FIG. 1, for example. The eNodeB 306 is communicatively connected to the MME/SGW 310 by one "S1" interface, and the eNodeB 308 is communicatively connected to the MME/SGW 312 by another "S1" interface. The eNodeB 304 is communicatively connected to both MME/SGW 310 and MME/SGW 312 by respective "S1" interfaces. It will be appreciated that the arrangement of network elements as described in the system 300 is illustrative, and that other arrangements are possible as well. Further, the system 300 can include other elements and network entities that are not necessarily shown in FIG. 3. In particular, there can be additional eNodeBs.

For purposes of illustration, an example handover of a UE 302 from the eNodeB 305 to the eNodeB 306 is also depicted in FIG. 3. As indicated, the UE 302 has an air interface connection 305 with the eNodeB 304. A potential air interface connection 307 with the eNodeB 306 represents the possibility that the eNodeB 306 would be serving the UE 302 as a result of a handover. A curved arrow from the eNodeB 304 to the eNodeB 306 represents a handover actually taking place. For example, eNodeB 304 may initially be the serving (source) base station, and eNodeB 306 may initially be the target base station for a handover. It is possible that the eNodeB 308 is also a target base station before the handover; however, in this example, the eNodeB 306 is evidently deemed a better target than the eNodeB 308. Under conventional LTE operation, the criteria for selecting one of possible multiple target base stations for handover do not include considerations of network signaling values used by the target base stations. Before describing example embodiments in which a UE takes loading at target eNodeBs into account, it is useful to briefly explain examples of conventional LTE handover operation.

In general, an inter-base station handover entails some form of monitoring by a UE 302 of downlink power in coverage areas served by two or more base stations (e.g., cell sectors served by eNodeBs 304, 306, and/or 308), where at least one of the base stations is the UE's serving base station and the others are possible target base stations. Monitoring downlink power may in a coverage area may involve the UE measuring downlink power on a specific channel, such as the pilot channel. In LTE, the UE 302 may report its observed downlink power measurements to its serving base station from time to time, either periodically or as triggered by a threshold condition, for example. The serving base station can then determine whether or not to initiate a handover, and, if so, to which target base station.

More particularly, LTE provides procedures by which a UE is instructed by its serving eNodeB 304 to begin monitoring downlink power and to report to the eNodeB on an event-triggered basis when one or more threshold conditions is met. The threshold conditions typically include one or more power levels against which the measured downlink powers are compared by the UE. The serving eNodeB 304 can set the threshold levels in its instruction the UE 302 to begin monitoring for one or more events. In such triggered handover procedures, the UE 302 sends a reporting message to its serving eNodeB 304 only when the UE 302 detects one of the qualifying trigger events. The UE's reporting message typically identifies one or more target eNodeBs that meet the criteria for the event trigger(s) and includes the downlink power measured by the UE for a coverage area served each target eNodeB 306. Each target eNodeB 306 then represents a "potential" handover candidate, in the sense that any one of them qualifies as a candidate for a possible handover. The serving eNodeB 304 can then determine an appropriate handover action, including whether to initiate a handover to one of the target eNodeBs 306.

In practice, a base station may provide served UEs with certain operational parameters useable by the UEs to facilitate operation in the wireless communication system. By way of example, and without limitation, such operational parameters could include parameters related to handover between coverage areas, and parameters related to CSFB operation. Numerous other examples may exist as well.

In terms of handover parameters, for instance, a base station may transmit to its served UEs a list of handover thresholds that the UEs should use as a basis to determine when to provide measurement reports and/or to engage in handover. Such handover thresholds may include, for instance, various signal strength thresholds defining particular handover-related events, such as:

"S-measure": Serving cell signal strength threshold below which the UE begins evaluating other handover thresholds A2 event: Serving cell signal strength becomes worse than a threshold, to trigger handover A3 event: Neighbor cell signal strength becomes more than a threshold delta higher than serving cell signal strength, to trigger handover A4 event: Neighbor cell signal strength becomes more than a threshold delta higher than a threshold, to trigger handover A5 event: Serving cell signal strength becomes lower than one threshold, and neighbor cell signal strength becomes higher than another threshold, to trigger handover.

It should be understood that the handover techniques described herein are provided by way of example, and are not intended to be limiting. Other handover thresholds may be specified as well.

In a further aspect, under conventional LTE, when a UE determines that a handover threshold or trigger event is detected, the UE may send a reference signal resource power (RSRP) message to its serving eNodeB to facilitate a determination as to whether or not a handover should be made. Before sending the RSRP message, the UE may determine an RSRP for its serving eNodeB (or more specifically, for the coverage area in which the UE is currently being served), and an RSRP for each of one or more neighboring coverage areas, some or all of which may be served by different eNodeBs. The calculation of the RSRP for the given sector may involve the UE determining a received signal strength (e.g., a measure of downlink power, such as a signal-to-noise ratio) of each reference signal that is received in the sector during a given subframe. The RSRP for a given sector may then be set equal to the average received signal strength across all reference signals in the subframe. The UE may then send an RSRP message, to its serving eNodeB, which includes the measured downlink power of the serving eNodeB (e.g., the RSRP that was determined for the current cell or sector in which the UE is operating) and the measured downlink power (e.g., the respectively determined RSRP) for each of one or more candidate cells or sectors, which may be served by one or more other "target" eNodeBs. The serving eNodeB can then use the information provided by the RSRP to help decide whether to initiate a handover of the UE to a candidate sector served by a different eNodeB.

According to exemplary embodiments, the above handover techniques, and others, may be modified by the UE in order to take loading information at one or more target eNodeBs into account. As such, a UE may evaluate whether or not to send an RSRP message to its serving eNodeB, and/or whether to include the downlink power measure for a given candidate sector served by another eNodeB in the RSRP, based on loading information for the given candidate sector.

For instance, the UE may determine loading information for a given candidate sector that is served by a target eNodeB based on power or signal strength variation (or lack thereof) amongst reference signals that are transmitted in the candidate sector by the target eNodeB. If the UE detects a certain power variation that is indicative of heavy loading in a candidate sector, the UE may refrain from sending an RSRP message, or may refrain from including the heavily loaded candidate eNodeB in an RSRP message. Alternatively, a UE may send an RSRP message as it normally would, but may also send its serving eNodeB the loading information that the UE determined via analysis of comparative power levels of resource signals in each target eNodeB. The serving (e.g., source) eNodeB can then take into account loading information for neighbor sectors, which may be served by different eNodeB, when determining whether a handover of the UE to a sector served by a different eNodeB should be initiated. Thus, exemplary methods and systems may help to prevent or reduce the likelihood of a blind inter-eNodeB handover to a heavily loaded eNodeB.

II. EXEMPLARY BASE-STATION METHODS

Figure 4:
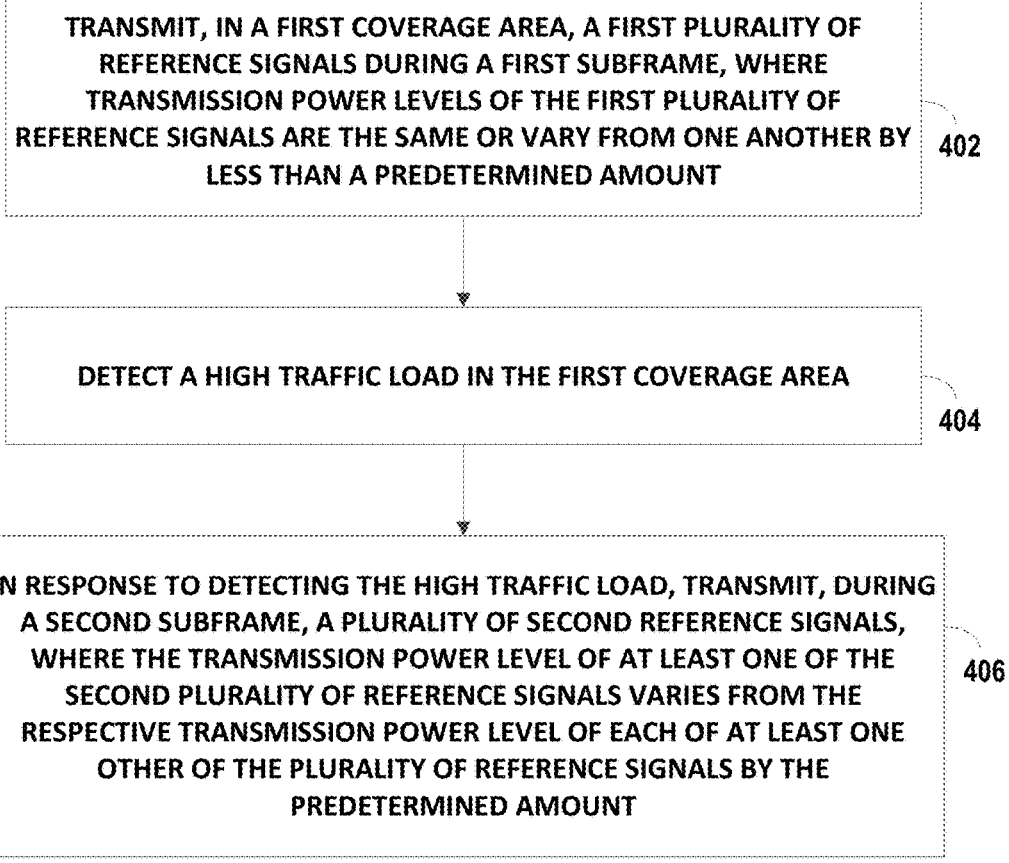
FIG. 4 is flow chart illustrating a method that may be carried out by a base station, according to an exemplary embodiment.

As noted above, exemplary methods may help to prevent or reduce the likelihood of a handover to an overloaded sector. For example, FIG. 4 is flow chart illustrating a method 400, according to an exemplary embodiment. Method 400 may be implemented by base station in radio access network, such as by an eNodeB, among other possibilities. Of course, it should be understood that method 400 or portions thereof may be implemented by other entities or combinations of entities, and/or may be implemented for other purposes, without departing from the scope of the invention.

As shown by block 402, method 400 involves an eNodeB initially transmitting a first plurality of reference signals during a first subframe in a first coverage area, where respective transmission power levels of the first plurality of reference signals are the same or vary from one another by less than a predetermined amount. More specifically, block 402 may be carried out at a time when the eNodeB determines that the traffic level or load in the first coverage area is low, or is below a predetermined threshold level. Since the traffic load in the first coverage area is low (or perhaps is just, "not high"), the eNodeB may transmit all of the reference signals in the first subframe at the same power level, which may be interpreted by UEs in the coverage area as an indication that the traffic load is low, and/or that the traffic load in the first coverage area is below a threshold level. Alternatively, at block 402, the eNodeB may indicate the traffic load in the first coverage area is low (or below a threshold level) by varying the power level of one or more reference signals in the subframe by a first amount that is less than the power level of the reference signal would be varied, if the traffic level is high (e.g., by 0.5 dB, as compared to a 1 dB variation when a sector is heavily loaded).

Referring now to block 404, the eNodeB may subsequently detect a high traffic load in the first coverage area. The high traffic load may be determined by measuring the loading or usage level of the uplink (and possibly the downlink) traffic channels in the coverage area. For instance, the eNodeB may determine total bandwidth that is in use, or a percentage of the available bandwidth that is being utilized. Further, such measures of the traffic load may be determined at the current time and/or based on some previous time period (e.g., by using a moving average of the traffic load over a predetermined window of time). Other measures of traffic load may also be determined and utilized by an eNodeB in an exemplary method, without departing from the scope of the invention.

In any event, at block 404, to determine that the traffic load is high, the eNodeB may compare the determined traffic load to a threshold load. Then, if the determined traffic load in the coverage area is greater than the threshold load, then the eNodeB may deem the traffic load to be "high." On the other hand, if the determined traffic load in the coverage area is less than (or equal to) the threshold load, then the eNodeB may deem the traffic load to be "low." Note that so long as the traffic load is determined to be low (or not "high"), the eNodeB may continue to transmit subframes using the technique described in block 402.

Referring now to block 406, in response to detecting the high traffic load, the eNodeB transmits, during a second subframe, a second plurality of reference signals, in which the transmission power level of one of the second plurality of reference signals varies from the respective transmission power levels of each of one or more of the other second reference by a predetermined amount. For instance, since the traffic load in the first coverage area is now higher (as compared to when block 402 was carried out), the eNodeB may indicate the traffic load in the first coverage area is high by varying the power level of one reference signal in the subframe by at least a predetermined amount. As a specific example, the eNodeB may increase or decrease the transmission power of reference signal in the load indication resource element by +/−1 dB. Other amounts of variation in transmission power are also possible.

In a further aspect, consider an implementation where the eNodeB varies the power level of the load-indication reference signal by a first amount (e.g., +/−0.5 dB) to indicate that the traffic load in a coverage area is low, and varies the power level of the load-indication reference signal by a second amount (e.g., +/−1 dB) to indicate that the traffic load in the same coverage area is high. At block 406 of such an embodiment, the eNodeB may vary the power level of the load-indication reference signal by a second amount that is greater than the first amount.

Further, the difference between: (a) the transmission-power variation of load-indication reference signal in the second subframe, which indicates a heavily loaded sector at block 406, and (b) the transmission-power variation (if any) of the load-indication reference signal in the first subframe, at block 402, may be significant enough that a UE can distinguish between the transmission-power variation that indicates a low traffic level and the transmission-power variation that indicates a high traffic level. For example, if the eNodeB indicates a high traffic level by increasing or decreasing the transmission power of load-indication reference signal by 1 dB as compared to the other reference signals in the same subframe, the eNodeB may indicate a low traffic level by only increasing or decreasing the transmission power of load-indication reference signal by 0.5 dB, as compared to the other reference signals that are transmitted in the same subframe. In current implementations of LTE, a UE at a given location will typically be able to detect the difference between a 1 dB variation and a 0.5 dB variation via comparison of the received signal strengths (e.g., the signal to noise ratio (SNR)) of reference signals.

In an exemplary embodiment, a particular resource element within the LTE frame structure may be designated as a "loading-indicator resource element." As such, the reference signal that is transmitted in each loading-indicator resource element may be referred to as a "loading-indicator reference signal" or simply a "loading indicator." For example, referring to FIGS. 2A and 2B, a particular resource element 250 in a particular resource block 208 may be designated as the reference signal that will serve as a load indicator in each subframe. In other words, resource element 250 of resource block 208 may be pre-defined as the loading-indicator resource element for each subframe, and the reference signal transmitted in resource element 250 may serve as a loading indictor (by of its transmission power as compared to reference signals transmitted in other resource elements during the same subframe).

As a more specific example, consider an LTE implementation with a 5 Mhz channel, where each subframe includes 25 resource blocks. Further, consider that four resource elements in each resource block may be designated for reference signals, such that each subframe includes a total of 100 reference signals. In this scenario, a particular one of the four reference signals, in a particular one of the 25 resource blocks, may be designated as a load indicator. In other words, a particular one of the 100 resource elements in each subframe is designated as the loading indicator for the eNodeB that transmits the subframes. Other examples are also possible.

III. EXEMPLARY USER-EQUIPMENT METHODS

Figure 5:
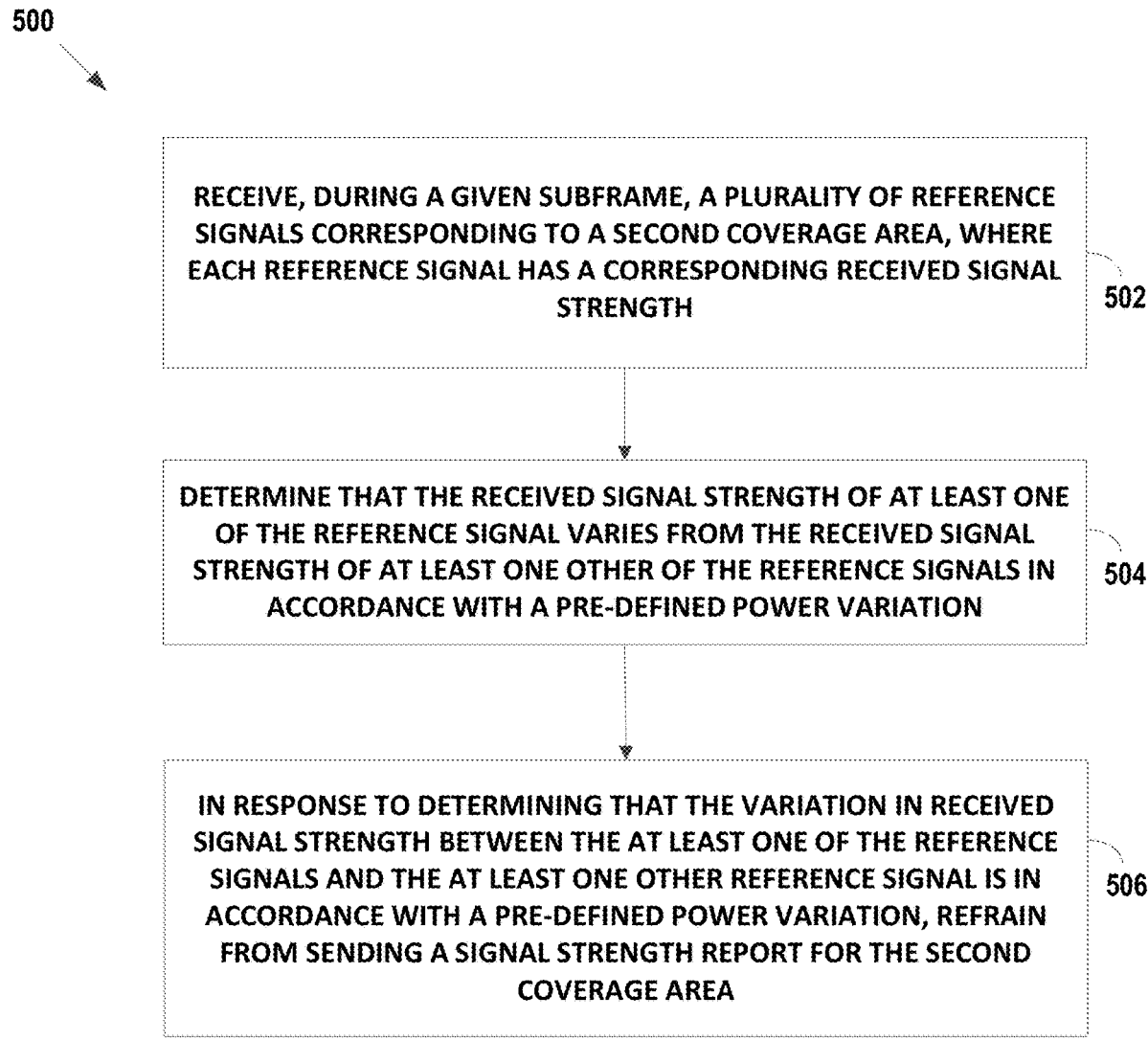
FIG. 5 is a flow chart illustrating a method that may be carried out by user equipment, according to an exemplary embodiment.

FIG. 5 is a flow chart illustrating a method 500 that may be carried out by a UE, according to an exemplary embodiment. In particular, method 500 may be implemented by a UE to detect an indication of traffic load in a coverage area that is provided by an eNodeB according to method 400, and to adjust reporting processes that support handover decisions according to the indication of traffic load in the coverage area. In particular, a UE may implement method 500 to detect when power variation of resource signals is indicative of heavy loading in a target sector, and responsively refrain from sending its serving eNodeB an RSRP for a target sector having a high traffic load.

More specifically, method 500 may be carried out by a UE that is operating in a first coverage area, and involves the UE receiving, during a given subframe, a plurality of reference signals corresponding to a second coverage area, where each reference signal has a corresponding received signal strength, as shown by block 502. The UE then determines that the received signal strength of at least one of the reference signal varies from the received signal strength of at least one other of the reference signals in accordance with a pre-defined power variation, as shown by block 504. The threshold amount of power variance may be pre-defined as an indication that the transmitting eNodeB is heavily loaded. Thus, in response to determining that the variation in received signal strength between the at least one of the reference signals and the at least one other of the reference signals is in accordance with the pre-defined power variation, the UE refrains from sending an RSRP message for the second coverage area, to the eNodeB that serves the first coverage area (e.g., the eNodeB that is currently serving the UE), as shown by block 506.

Figure 6:
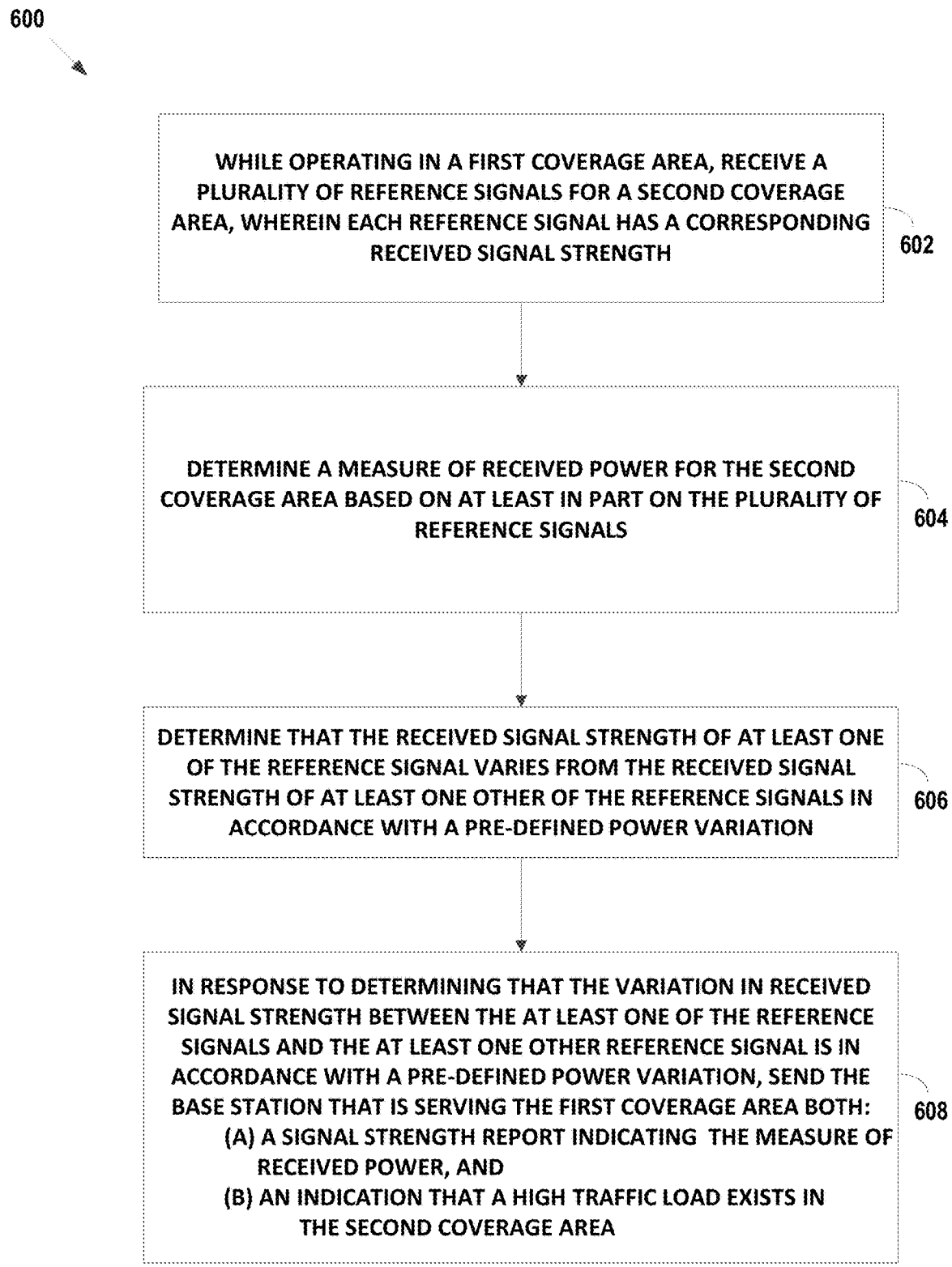
FIG. 6 is a flow chart illustrating another method that may be carried out by user equipment, according to an exemplary embodiment.

FIG. 6 is a flow chart illustrating another method 600 that may be carried out by a UE, according to an exemplary embodiment. Method 600 may also be implemented by a UE to respond to an indication of loading that is provided by a target eNodeB according to method 400. However, instead of refraining from sending an RSRP, a UE that implements method 600 may indicate to its serving eNodeB that a second coverage area served by a target eNodeB is heavily loaded at the same time as the UE reports the measured RSRP for the second coverage area to its serving eNodeB.

More generally, method 600 may be carried out by a UE that is operating in a first coverage area, and involves the UE receiving a plurality of reference signals for a second coverage area, wherein each reference signal has a corresponding received signal strength, as shown by block 602. The UE then determines a measure of received power (e.g., the RSRP) for the second coverage area based at least in part on the plurality of reference signals, as shown by block 604. Further, the UE determines that the received signal strength of at least one of the reference signal varies from the received signal strength of at least one other of the reference signals in accordance with a pre-defined power variation, as shown by block 606. In other words, the UE may monitor reference signals in each subframe and detect the occurrence of a variation in the received power level or signal strength amongst the reference signals that corresponds to the pre-determined variation in transmit power that is indicative of a heavily loaded sector.

Referring now to block 608, in response to determining that the variation in received signal strength between the at least one of the reference signals and the at least one other of the reference signals is in accordance with the pre-defined power variation sending, the UE sends the base station serving the first coverage area (e.g., the UE's serving base station), both: (a) a signal strength report indicating the measure of received power for the second coverage area, and (b) an indication that a high traffic load exists in the second coverage area.

Note that at block 606 of method 600, and/or at block 504 of method 500, various techniques may be utilized to determine that the received signal strength of at least one of the reference signal varies from the received signal strength of at least one other of the reference signals in accordance with a pre-defined power variation. For example, the UE may initially determine a respective received power level for each of the reference signals that are received during a particular subframe. In an example embodiment, the measure of the received signal strength may be a signal-to-noise (SNR) ratio for the reference signal, or some other measure of signal strength. The UE may then compare the measure of received power for the reference signal that serves as a loading indicator (e.g., the measured SNR of the loading-indicator reference signal) to the respective measures of received power for other reference signals received in the same coverage area during the same subframe.

More specifically, if the received power level of the loading indicator is greater than the received power levels of the other reference signals received during the same subframe by at least the threshold amount, then the UE may determine that the coverage area is heavily loaded (e.g., that the traffic level in the coverage area is high). If, on the other hand, the difference between the received power level of the loading indicator the respective received power level of each of the other reference signals in the subframe is less than the threshold amount, then the UE may determine that the coverage area is not heavily loaded (e.g., that the traffic level in the coverage area is not high), or perhaps that the coverage area is has a lower load (e.g., that the traffic level in the coverage area is low).

Further, in method 500 and/or in method 600, the UE may send (or refrain from sending) various types of signal strength reports, depending upon the particular implementation. For example, if the UE an RSRP(s) for neighbor coverage area(s), the signal strength report may take the form of one or more RSRP messages, which include the measured RSRP(s) (or other measures of received power) for one or more neighbor coverage areas. As another example, the UE may determine a reference signal receive quality (RSRQ) for as a measure of received power level or signal strength in neighbor coverage area. The RSRQ for a given coverage area may be a ratio of the RSRP as compared to the noise (e.g., RSRP/noise) in the given coverage area. In such an embodiment, the signal strength report may take the form of one or more RSRQ messages, which include the measured RSRQ(s) (or other measures of received power) for one or more neighbor coverage areas. Further, in some embodiments, the UE could determine both the RSRP and RSRQ for each of one or more neighbor coverage areas, and report both the RSRP and RSRQ to its serving eNodeB. Other types of signal strength reports are also possible, without departing from the scope of the invention

IV. EXEMPLARY BASE STATION

Figure 7:
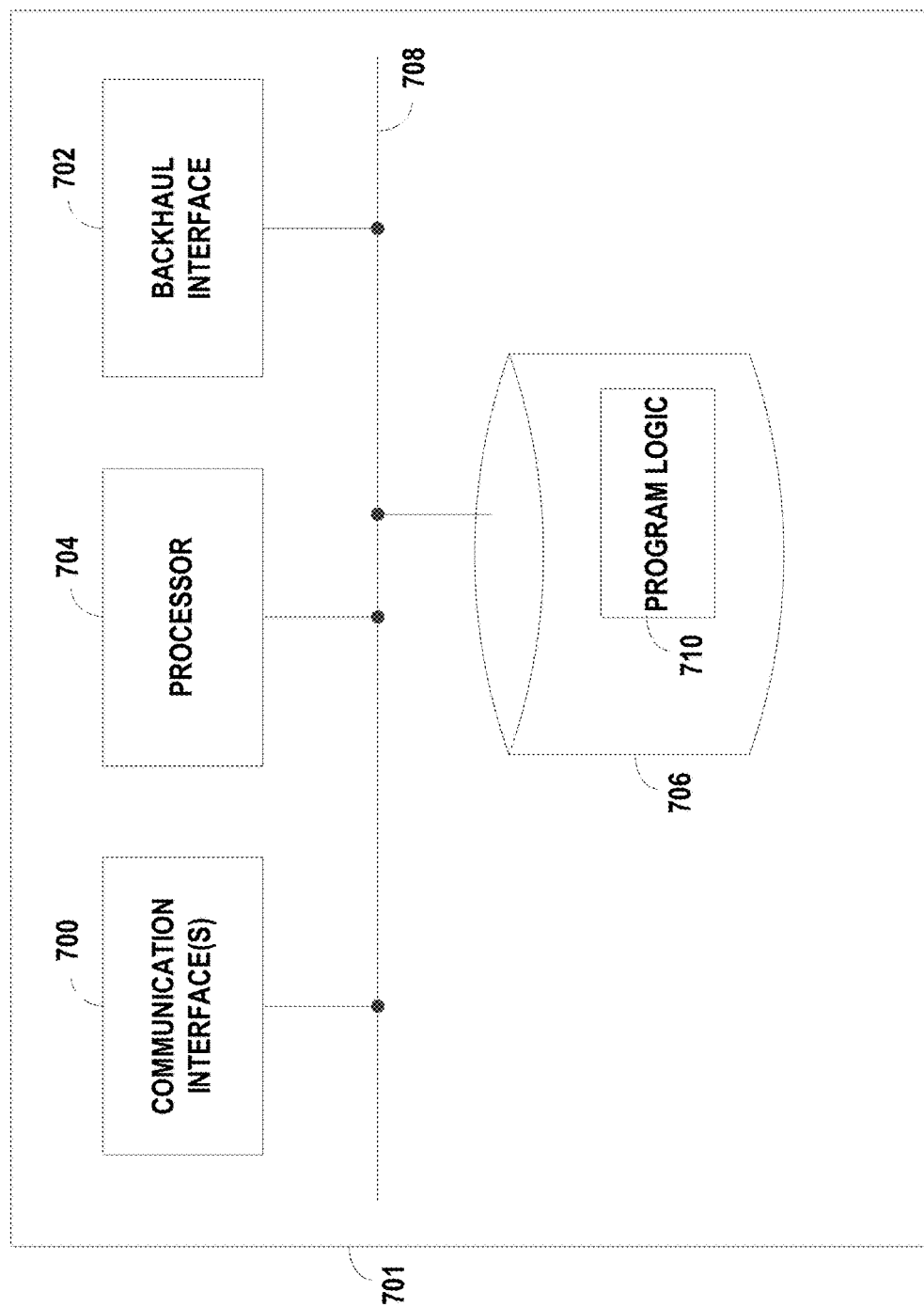
FIG. 7 is a simplified block diagram exemplifying a base station, according to an exemplary embodiment.

FIG. 7 is a simplified block diagram exemplifying an eNodeB 701, according to an exemplary embodiment. In particular, FIG. 7 illustrates functional components that might be found in an eNodeB 701 that is arranged to operate in accordance with the embodiments herein. As shown, the eNodeB 701 may include a communication interface 700, a backhaul interface 702, a processor 704, and data storage 706, all of which may be communicatively linked together by a system bus, network, or one or more other connection mechanisms 708.

Note that some or all of the description of eNodeB 701 may apply equally to other types of base stations, and to other network components as well. Further, some of the illustrated components of eNodeB 701 (e.g., communication interface 700, a backhaul interface 702, a processor 704, and/or data storage 706) may be distributed and/or subdivided between one or more other entities in an LTE network and/or in a CDMA network.

In eNodeB 701, communication interface 700 may comprise one or more wired or wireless communication interfaces and/or other associated equipment for engaging in communications with other network entities and/or for engaging in RF communications with mobile stations according to one or more air interface protocols. Accordingly, at least one communication interface 700 may be operable to provide service in one or more coverage areas (e.g., cells or sectors) of an LTE network or another type of cellular network. Backhaul interface 702 may comprise any sort of communication link or mechanism enabling the eNodeB 701 to exchange signaling and bearer data with other network entities. In an example embodiment, backhaul interface 702 may be configured for communications via one or more X2 links with one or more other eNodeBs. Further, processor 704 may comprise one or more processors (e.g., general purpose and/or special purpose processors), such as microprocessors for instance.

Data storage 706 may be a non-transitory computer readable medium. For example, data storage 706 may take the form of one or more volatile and/or non-volatile storage components, such as magnetic, optical, or organic storage components, integrated in whole or in part with processor 704. As further shown, data storage 706 contains program logic 710 (e.g., machine language instructions or program instructions) that is executable by processor 704 to carry out various functions, such as the functionality of the exemplary methods and systems described herein.

In an exemplary embodiment, data storage 706 may include program instructions that are executable by processor 704 to: (i) during a first subframe, transmit a first plurality of reference signals in a first coverage area served by the eNodeB 701, where respective transmission power levels of the first plurality of reference signals are the same or vary from one another by less than a first threshold amount, (ii) subsequently detect a high traffic load in the first coverage area; and (iii) in response to detection of the high traffic load in the first coverage area, transmit, during a second subframe, a second plurality of second reference signals in the first coverage area, where the transmission power level of at least one of the second plurality of reference signals varies from the respective transmission power levels the remaining reference signals in the second plurality of reference signals by at least a threshold amount.

V. CONCLUSION

It should be understood the arrangements and functions described herein are presented for purposes of example only, and that numerous variations are possible. For instance, elements can be added, omitted, combined, distributed, reordered, or otherwise modified.

Further, where this document mentions functions that can be carried out by a device or other entity, it should be understood that the functions may be implemented by software (e.g., machine language instructions stored in data storage and executable by a processor), firmware, and/or hardware that is provided in the entity. For example, an entity such as a UE may include a processor, as well as program instructions stored on a non-transitory computer readable medium and executable by the processor to carry out and/or facilitate the functionality of the entity that is described herein. Other examples are also possible.

We claim:
1. A method comprising:
   during a first subframe in a first coverage area, transmitting, by a first base station, a first plurality of reference signals, wherein respective transmission power levels of the first plurality of reference signals are the same or vary from one another by less than a predetermined amount;

subsequently detecting, by the first base station, a high traffic level in the first coverage area; and in response to detecting the high traffic load, transmitting, by the first base station, during a second subframe in the first coverage area, a plurality of second reference signals, wherein a transmission power level of at least one of the second plurality of reference signals varies from the transmission power level of at least one other reference signal in the second plurality of reference signals by the predetermined amount, and receiving, by a second base station, from a user equipment (UE) that detected the plurality of second reference signals transmitted by the first base station and is also being served in a second coverage area by the second base station, both: (a) a signal strength report signal comprising an indication of received signal strength for the first coverage area, and (b) an indication that a high traffic load exists in the first coverage area.

2. The method of claim 1, wherein which each downlink subframe for the first coverage area comprises a plurality of resource elements, and wherein a pre-determined set of the resource elements in each subframe are allocated for reference signals.

3. The method of claim 2, wherein a particular one of the set of resource elements is designated for a reference signal that serves as a loading indicator for the first coverage area, and wherein the reference signal for which the transmission power level is varied by the predetermined amount is transmitted in the particular resource element of the second subframe that is designated as the loading indicator.

4. The method of claim 1, wherein the predetermined amount comprises 1 decibel (dB).

5. The method of claim 1, wherein the first base station comprises a first eNodeB and the second base station comprises a second eNodeB.

6. A radio access network system comprising:
a first base station comprising: at least one communication interface configured to provide service in at least a first coverage area, at least one processor, and program instructions stored in a non-transitory computer readable medium and executable by the at least one processor to:
transmit a first plurality of reference signals during a first subframe in the first coverage area, wherein respective transmission power levels of the first plurality of reference signals are the same or vary from one another by less than a predetermined amount;
subsequently detect a high traffic load in the first coverage area; and in response to detection of the high traffic load in the first coverage area, during a second subframe, transmit a second plurality of second reference signals in the first coverage area, wherein a transmission power level of at least one of the second plurality of reference signals varies from the transmission power level of at least one other reference signal in the second plurality of reference signals by a predetermined amount and a second base station configured to receive, from a user equipment (UE) that detected the plurality of second reference signals transmitted by the first base station and is also being served in a second coverage area by the second base station, both: (a) a signal strength report signal comprising an indication of received signal strength for the first coverage area, and (b) an indication that a high traffic load exists in the first coverage area.

7. The system of claim 6, wherein which each downlink subframe for the first coverage area comprises a plurality of resource elements, and wherein a pre-determined set of the resource elements in each subframe are allocated for reference signals.

8. The system of claim 7, wherein a particular one of the set of resource elements is designated as a loading indicator for the first coverage area, and wherein the reference signal for which the transmission power level is varied by at least the predetermined amount is transmitted in the particular resource element of the second subframe that is designated for the loading indicator.

9. The system of claim 6, wherein the predetermined amount comprises 1 decibel (dB).

10. The system of claim 6, wherein the predetermined amount comprises a first threshold amount of transmission power variation, wherein detection of a high traffic load in the first coverage area comprises a determination that a traffic level is above a first threshold level; and wherein the first base station further comprises program instructions stored in the non-transitory computer readable medium and executable by the at least one processor to:
determine that the traffic level in the first coverage area is below the first threshold level; and responsively transmit a third plurality of reference signals in the first coverage area during a third subframe, wherein a transmission power level of at least one of the third plurality of reference signals varies from the respective transmission power levels of the remaining reference signals in the third plurality of reference signals by at least a second threshold amount, wherein the second threshold amount is less than the first threshold amount.

11. The system of claim 10, wherein the first threshold amount comprises 1 decibel (dB), and wherein the second threshold amount comprises 0.5 dB.

12. A method comprising:
receiving, during a given subframe, by a user equipment (UE) that is operating in a first coverage area, a plurality of reference signals for a second coverage area, wherein each reference signal has a corresponding received signal strength;
determining, by the UE, a measure of received power for the second coverage area based at least in part on the plurality of reference signals;
determining, by the UE, that the received signal strength of at least one of the reference signal varies from the received signal strength of at least one other of the reference signals in accordance with a pre-defined power variation; and
in response to determining that the variation in received signal strength between the at least one of the reference signals and the at least one other of the reference signals is in accordance with the pre-defined power variation:
sending, by the UE, to a base station serving the first coverage area, both: (a) a signal strength report indicating the measure of received power, and (b) an indication that a high traffic load exists in the second coverage area.

13. The method of claim 12, wherein the plurality of reference signals are received during a particular subframe.

14. The method of claim 13, wherein determining that the received signal strength of one of the reference signals varies from the received signal strength of each of the other reference signals by at least the threshold amount comprises:
determining a respective received power level for each of the reference signals that are received during the particular subframe; and determining that the received power level for one of the reference signals received during the particular subframe has respective received power level that is greater than the respective received power levels of the other reference signals received during the particular subframe by the threshold amount.

15. The method of claim 12, wherein the threshold amount comprises a difference in received signal strength that corresponds to a 1 dB variance in transmission power.

16. The method of claim 12, wherein determining that the variation in received signal strength between the at least one of the reference signals and the at least one other of the reference signals is in accordance with the pre-defined power variation comprises:
  determining a respective received power level for each of the reference signals that are received during the particular subframe; and
  determining that the received power level for one of the reference signals received during the particular subframe has respective received power level that is less than the respective received power levels of the other reference signals received during the particular subframe by the threshold amount.

17. The method of claim 16, wherein the pre-defined power variation comprises a difference in received signal strength corresponding to a 1 dB variance in transmission power.

18. The method of claim 12, wherein determining the measure of received power for the second coverage area comprises determining a reference signal receive power (RSRP) for the second coverage area, and wherein the signal strength report comprises an RSRP message.

19. The method of claim 12, wherein determining the measure of received power for the second coverage area comprises determining a reference signal receive quality (RSRQ) message for the second coverage area, and wherein the signal strength report comprises an RSRQ message.

20. A method comprising:
  receiving, by a user equipment (UE) that is operating in a first coverage area, during a given subframe, a plurality of reference signals corresponding to a second coverage area, wherein each reference signal has a corresponding received signal strength;
  determining, by the UE, that the received signal strength of at least one of the reference signal varies from the received signal strength of at least one other of the reference signals in accordance with a pre-defined power variation; and
  in response to determining that the variation in received signal strength between the at least one of the reference signals and the at least one other of the reference signals is in accordance with the pre-defined power variation, the UE refraining from sending signal strength report for the second coverage area to a base station that serves the first coverage area.

21. The method of claim 20, wherein refraining from sending signal strength report for the second coverage area comprises refraining from sending a reference signal receive power (RSRP) message to a base station serving the first coverage area.

22. The method of claim 20, wherein refraining from sending signal strength report for the second coverage area comprises refraining from including signal strength information for the second coverage area in a signal strength report that is sent to the base station serving the first coverage area.

23. The method of claim 22, wherein the signal strength report that is sent to the base station serving comprises a first coverage area comprises a reference signal receive power (RSRP) message indicating a measured RSRP for one or more coverage areas other than the first coverage area.

* * * * *